United States Patent [19]

Nakamura et al.

[11] Patent Number: 4,879,795
[45] Date of Patent: Nov. 14, 1989

[54] VALVE INSERTING APPARATUS FOR AN INTERNAL COMBUSTION ENGINE

[75] Inventors: Katsumi Nakamura; Norio Honda; Kazufumi Tamura, all of Suzuka; Akifumi Kobayashi, Yokkaichi, all of Japan

[73] Assignees: Honda Giken Kogyo Kabushiki Kaisha, Tokyo; Dainichi Kogyo Kabushiki Kaisha, Yokkaichi, both of Japan

[21] Appl. No.: 146,949

[22] Filed: Jan. 22, 1988

[51] Int. Cl.⁴ ............................................. B23P 19/04
[52] U.S. Cl. ..................................... 29/214; 29/281.4
[58] Field of Search ...................... 29/214, 271, 281.4, 29/281.5

[56] References Cited

U.S. PATENT DOCUMENTS

| | | | |
|---|---|---|---|
| 1,483,532 | 2/1924 | Tobey | 29/281.4 |
| 2,286,695 | 6/1942 | Taylor . | |
| 3,742,579 | 7/1973 | Oftedahl | 29/214 |
| 4,675,969 | 6/1987 | Saaky et al. | 29/281.4 |

FOREIGN PATENT DOCUMENTS

| | | |
|---|---|---|
| 52-27866 | 7/1977 | Japan . |
| 59-224224 | 12/1984 | Japan . |
| 093065 | 6/1980 | U.S.S.R. . |

*Primary Examiner*—Judy Hartman

*Attorney, Agent, or Firm*—Armstrong, Nikaido, Marmelstein, Kubovcik & Murray

[57] ABSTRACT

A valve inserting apparatus is provided for an internal combustion engine having an intake valve and an exhaust valve inserted into respective valve guides on the intake and the exhaust of engine. The valve inserting apparatus comprises a pair of valve supply devices for supplying intake valves and the exhaust valves. A jig has a jig plate, a jig base and a horizontal shaft. The jig plate is supported on the jig base and is swingable about the shaft. A valve inserting device inserts both the intake and exhaust valves. A base for the two valve supply devices and the jig is disposed circumferentially around the base. A supporting column is mounted on the base. The supporting column is movable to advance towards and retract from the jig. The valve inserting device is supported on a swingable frame swingably mounted an the supporting column. By advancing and retracting the supporting column and swinging the swingable frame, the valve inserting device is moved between a position above each of the valve supply devices and a position above the jig. The valve inserting device inserts an intake valve into the valve guide on the intake side when the jig plate is swung to the first swung position, and the valve inserting device inserts an exhaust valve supplied from the exhaust valve supply device into the valve guide on the exhaust side when the jig plate is swung to the second swung position.

4 Claims, 8 Drawing Sheets

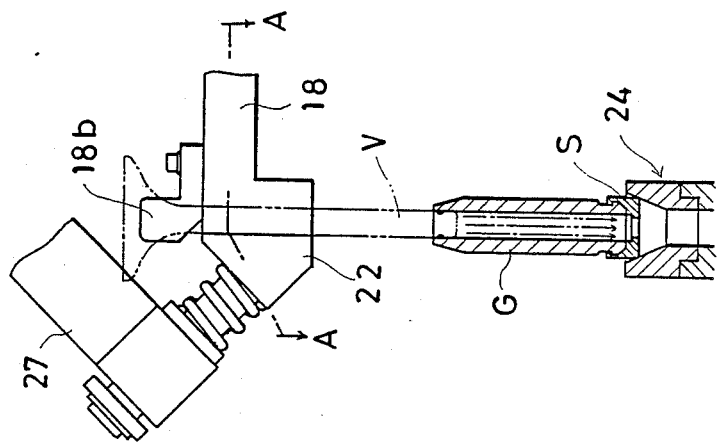
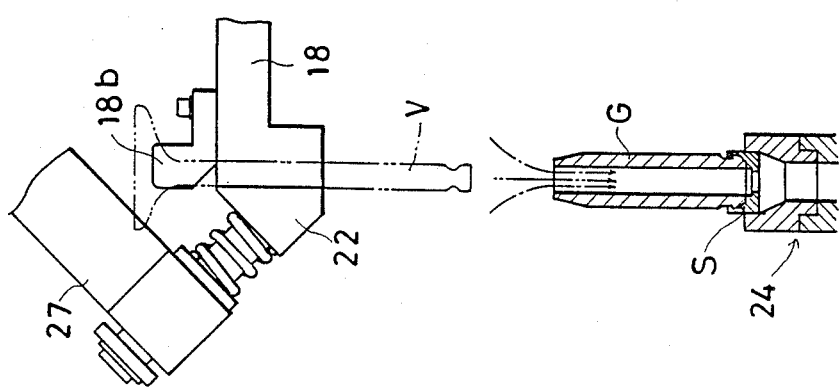

VALVE INSERTING APPARATUS FOR AN INTERNAL COMBUSTION ENGINE

BACKGROUND OF THE INVENTION

1. Field of the Invention:

This invention relates to a valve inserting apparatus for inserting an intake valve and an exhaust valve into respective valve guides on the intake side and the exhaust side of a cylinder head of an engine such that the longitudinal axes of the valves cross each other obliquely.

2. Description of the Prior Art:

It has been usual hitherto that assembling stations for an intake valve and an exhaust valve are provided separately, so that the respective valves may be inserted in respective valve guides of a cylinder head at the respective assembling stations.

For effecting this inserting operation automatically, Japanese Patent Application Publication No. Sho 52-27866 discloses an apparatus which comprises at each of the foregoing two assembling stations, a valve supply means for supplying each valve with its head portion facing up, a jig means having a jig plate which can set thereon, a cylinder head with its surface on a combustion chamber side facing up, a valve inserting unit having a holding means for detachably holding each valve and a valve push-in means. The jig plate of the jig means provided at the assembling station for the intake valve, is so swung that the longitudinal axis of the valve guide on the intake side of the cylinder head is made vertical, and the intake valve supplied from the valve supply means for the intake valve is inserted into the valve guide on the intake side by the valve inserting unit provided at that station. Then, when the jig plate of the jig means provided at the assembling station for the exhaust valve is swung so that the longitudinal axis of the valve guide on the exhaust side of the cylinder head is made vertical, the exhaust valve supplied from the valve supply means is inserted into the valve guide on the exhaust side by the valve inserting unit provided at that station.

This conventional apparatus has a problem because it requires separate assembling stations for the intake valve and the exhaust valve, which results in the apparatus being long. The length of the apparatus requires the use of valuable factory space.

SUMMARY OF THE INVENTION

It is an object of the present invention to provide a valve inserting apparatus wherein intake and exhaust valves can be inserted with valve guides in the cylinder head of an engine at a single assembly station.

The present invention is directed to a valve inserting apparatus for an internal combustion engine having an intake valve and an exhaust valve inserted into respective valve guides on the intake side and the exhaust side of a cylinder head of the engine such that the longitudinal axes of the valves cross each other obliquely. The valve inserting apparatus comprises a pair of valve supply devices for supplying intake valves and the exhaust valves, each intake and exhaust valve having a head and stem; and a jig having a jig plate, a jig base and a horizontal shaft, wherein the jig plate is supported on the jig base and is swingable about the shaft such that the jig plate swings from its horizontal position to a first swung position wherein the longitudinal axis of the valve guide on the intake side is made vertical and a second swung position wherein the longitudinal axis of the valve guide on the exhaust side is vertical. A valve inserting device for inserting both the intake and exhaust valves, the inserting device having a holding device which detachably holds each valve and a valve push-in device. A base having the two valve supply device and the jig is disposed circumferentially around the base and a supporting column is mounted on the base. The supporting column is movable to advance towards and retract from the jig and the valve inserting device is supported on a swingable frame swingably mounted on an outer circumference of the supporting column, such that by advancing and retracting the supporting column and swinging the swingable frame, the valve inserting device is moved between a position above each of the valve supply device and a position above the jig. The valve inserting device inserts an intake valve supplied from the intake valve supply device into the valve guide on the intake side when the jig plate is swung to the first swung position, and the valve inserting device inserts an exhaust valve supplied from the exhaust valve supply into the valve guide on the exhaust side when the jig plate is swung to the second swung position.

BRIEF DESCRIPTION OF THE DRAWINGS

FIGS. 8–10 are views for explaining the operation of a valve holding means of the present invention.

DETAILED DESCRIPTION OF THE PREFERRED EMBODIMENT

Figure 1:
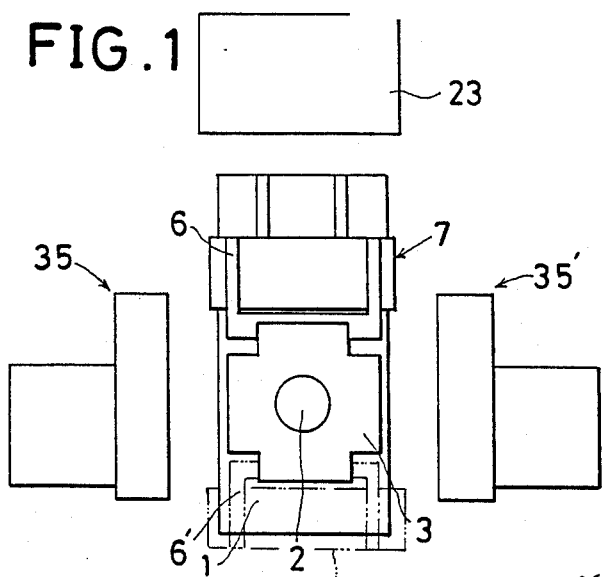
FIG. 1 is a top plan view of the entire apparatus of the present invention.
Figure 2:
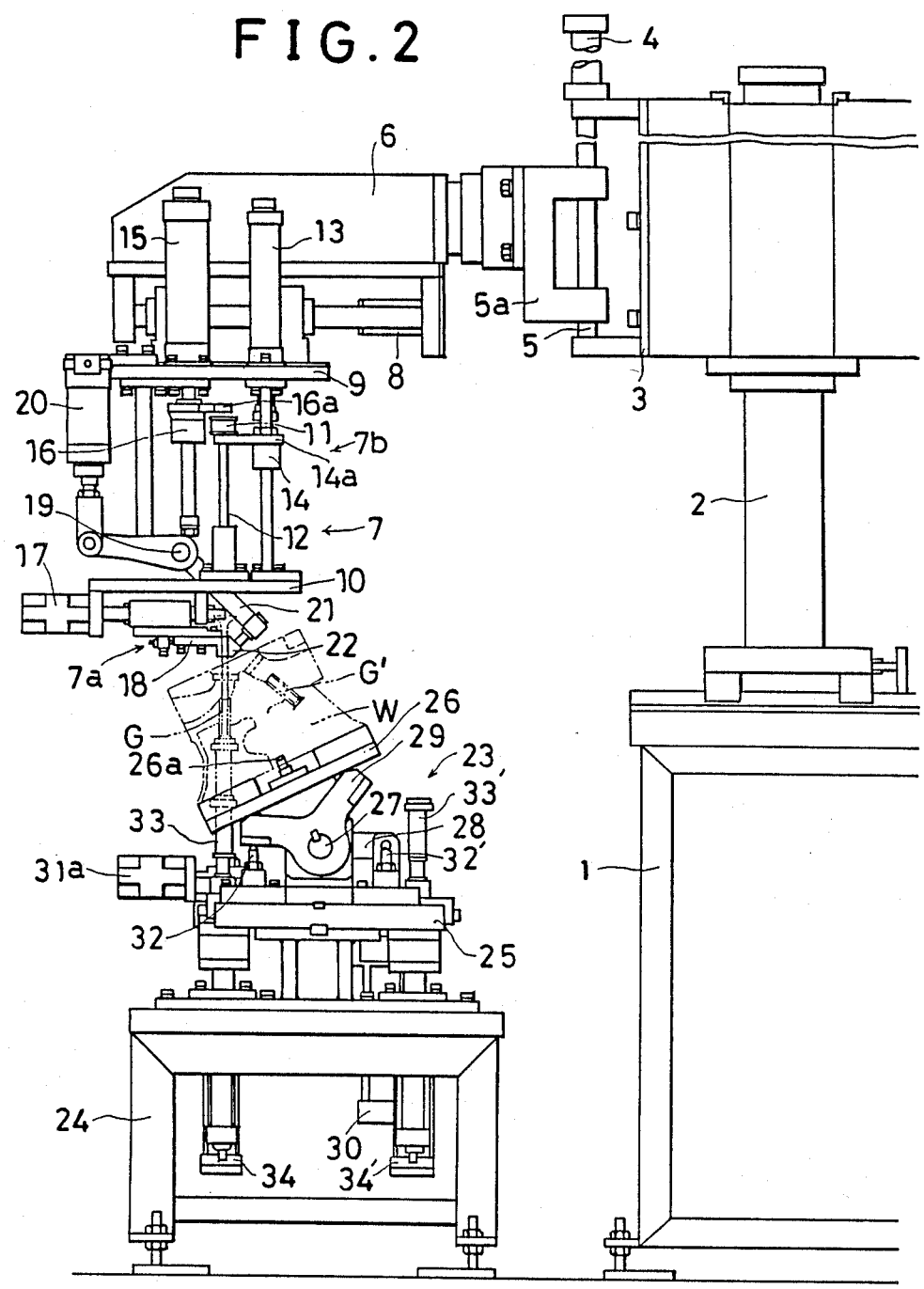
FIG. 2 is a side view of a valve inserting unit moved to an upper side of a jig means of the present invention.

Referring to FIGS. 1 and 2, a supporting column 2 is vertically provided on a machine base 1 so as to be movable forward and rearward by a driving source (not illustrated). A swingable frame 3 is supported on an outer circumference of an upper portion of the supporting column 2 so as to be swingable by a driving source (not illustrated), and a supporting arm 6 which is movable upwards and downwards along a guide bar 5 by a cylinder 4 is attached to the swingable frame 3. The supporting arm 6 is provided with a valve inserting unit 7 extending downward therefrom.

The valve inserting unit 7 has a pair of upper and lower parallel supporting plates 9 and 10 arranged to be horizontally movable along the supporting arm 6 by a cylinder 8. The valve inserting unit 7 includes a valve holding means 7a and a valve push-in means 7b.

Figure 3:
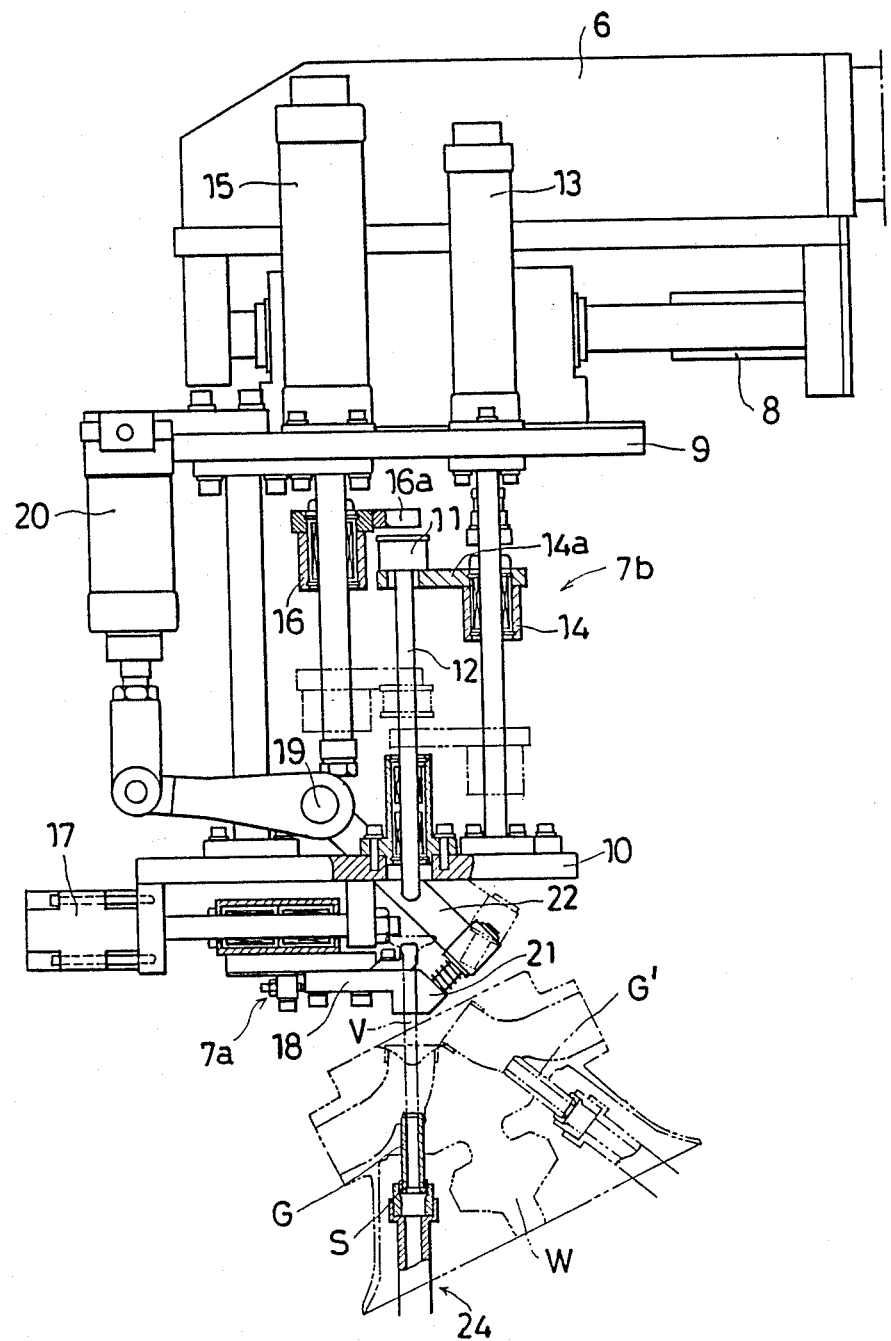
FIG. 3 is an enlarged side view of the valve inserting unit of the present invention.
Figure 4:
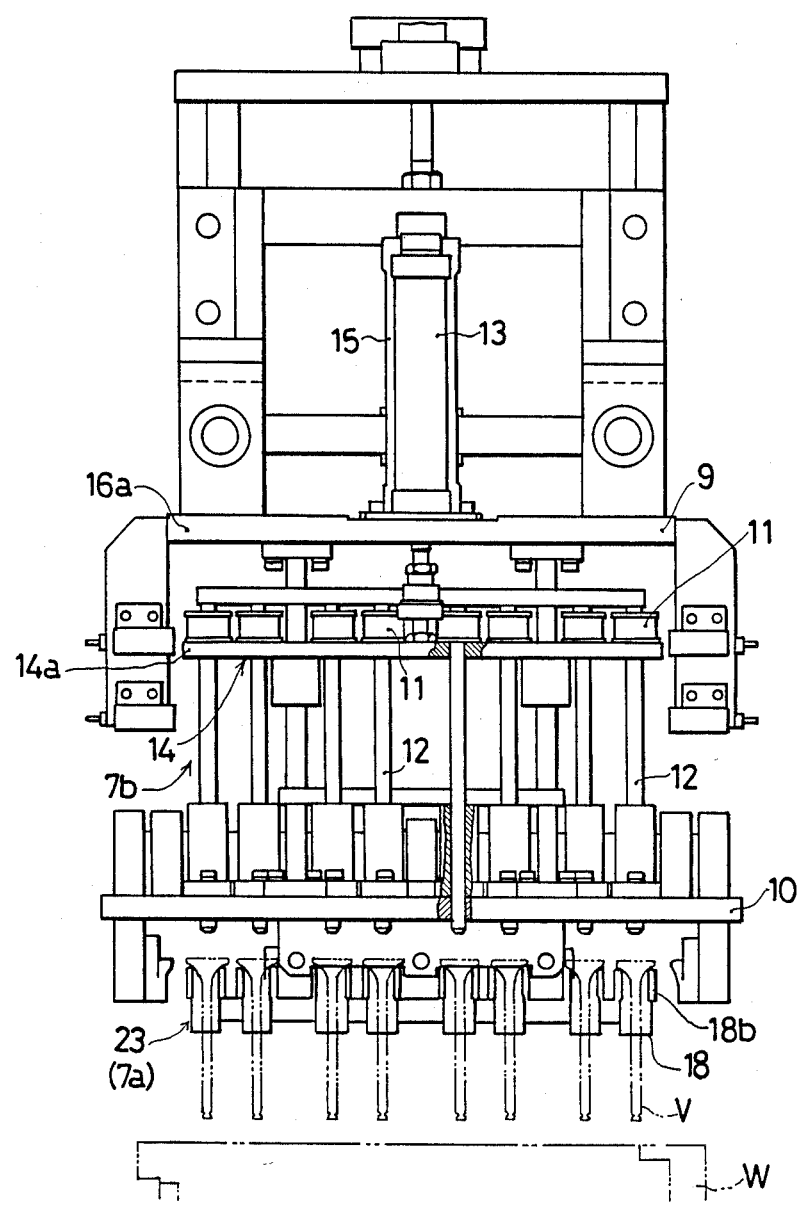
FIG. 4 is a front view of the valve inserting unit viewed from the right in FIG. 3.

As shown clearly in FIG. 3, the valve push-in means 7b comprises a push rod 12 which is inserted through the lower supporting plate 10 and is movable upwards and downwards. A weight 11 is provided at the upper end of push rod 12. A push rod supporting member 14, which is movable upwards and downwards by a cylinder 13, is fixed to the upper supporting plate 9 and serves to support, at a horizontally extending portion 14a, a lower portion of the weight 11 of the push rod 12. A push rod pushing member 6, which is movable upwards and downwards by a cylinder 15, is fixed to the upper supporting plate 9 and uses its horizontally extending portion 16a to push the upper end portion of the push rod 12.

The push down force of the push rod 12 caused by its own weight including the weight 11, is set to be less than the force needed for causing the lower end of a valve V to thrust through a stem seal S attached to a lower end of a valve guide G. Thus, the lower end of the valve V passes through the stem seal S as a result of the pushing force of the push rod 12 and the weight 11 plus the pushing force of the pushing member 16.

Figure 11:
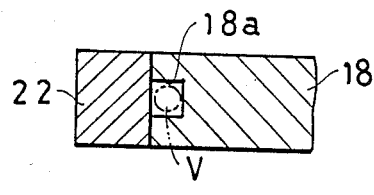
FIG. 11 is a sectional view taken along the line A—A in FIG. 9.
Figure 12:
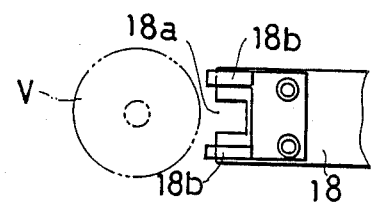
FIG. 12 is a top plan view of the valve holding means.

The holding means 7a comprises a guide member 18 which is moved by a cylinder 17 in the horizontal direction in relation to the supporting plate 10. The guide member 18 is provided at its end surface with a guide groove 18a which is slightly larger than the diameter of the shaft portion of the valve V, as shown in FIGS. 11 and 12. A closure member 22 is fixed to an end portion of a lever 21 and is rotatable about a supporting shaft 19 by the operation of a cylinder 20. The closure member 22 opens and closes the guide groove 18a of the guide member 18. Valve head supporting members 18b for supporting the head portion of the valve V at two points on the circumference of a tapered surface thereof, project from an upper surface of the guide member 18, so that the valve V can be swung with respect to the supporting members 18b to the extent of the free space within the guide groove 18a.

The above described embodiment is a valve inserting apparatus for a multi-cylinder engine, in which there are plural pairs of guide members 18 and closure members 22 forming the valve holding means 7a, and a plurality of the push rods 12 forming the valve push-in means 7b.

Figure 5:
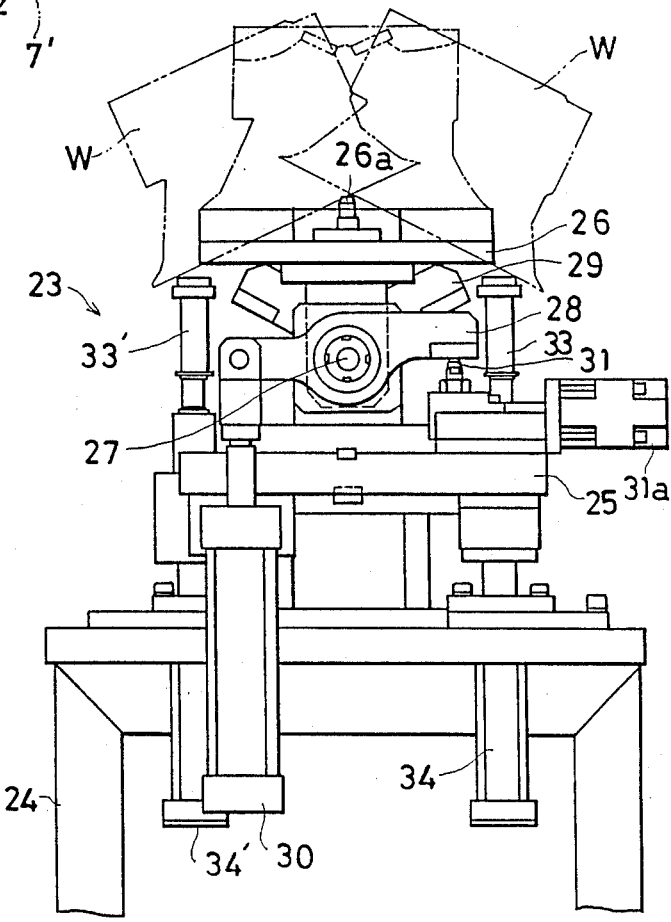
FIG. 5 is a side view of the jig means viewed from a side opposite to that in FIG. 2.

A jig means 23 is located in front of the machine base 1. The jig means 23, as shown clearly in FIGS. 2 and 5, comprises a jig plate 26 for supporting a cylinder head W, with its surface on a combustion chamber side facing upward. The jig plate 26 is pivotally supported on a jig base 25 mounted on a supporting base 24 such that the jig plate 26 is swingable about a horizontal shaft 27.

A lever 28 and a nearly V-shaped stopper member 29 are fixed to an end portion of the horizontal shaft 27, and a cylinder 30 on the supporting base 24, is connected to one end of the lever 28 such that the jig plate 26 may be swung by the cylinder 30. A stopper pin 31, which is arranged to abut the other end of the lever 28 for positioning the jig plate 26 in its horizontal position, is provided on the jig base 25 and is retractable by a cylinder 31a to a withdrawn position for allowing a swing movement of the jig plate 26. Additionally, a pair of stopper pins 32 and 32' are mounted on jig base 25 to abut the corresponding ends of the stopper member 29 for regulating the swinging movement of the jig plate 26. Thus, at the position where the swing movement in one direction thereof is regulated by the stopper pin 32 on one side, the longitudinal axis of the valve guide G on the intake side of the cylinder head W is vertical, and at the position where the swing movement in the other direction thereof is regulated by the stopper 32' on the other side, the longitudinal axis of the valve guide G' on the exhaust side is vertical. A positioning pin 26a for the cylinder head W is provided on the jig plate 26.

A pair of tubular suction means 33 and 33' connected to a negative pressure source (not illustrated), are positioned on the supporting base 24 coaxial with the longitudinal axes of the respective valve guides G and G, when the jig plate 26 is in its respective swung position in one direction or the other, so that, by moving the respective suction means 33 and 33' upwards and downwards by the respective cylinders 34 and 34', the suction means are brought into contact with and separated from the lower ends of the respective valve guides G and G'.

Figure 6:
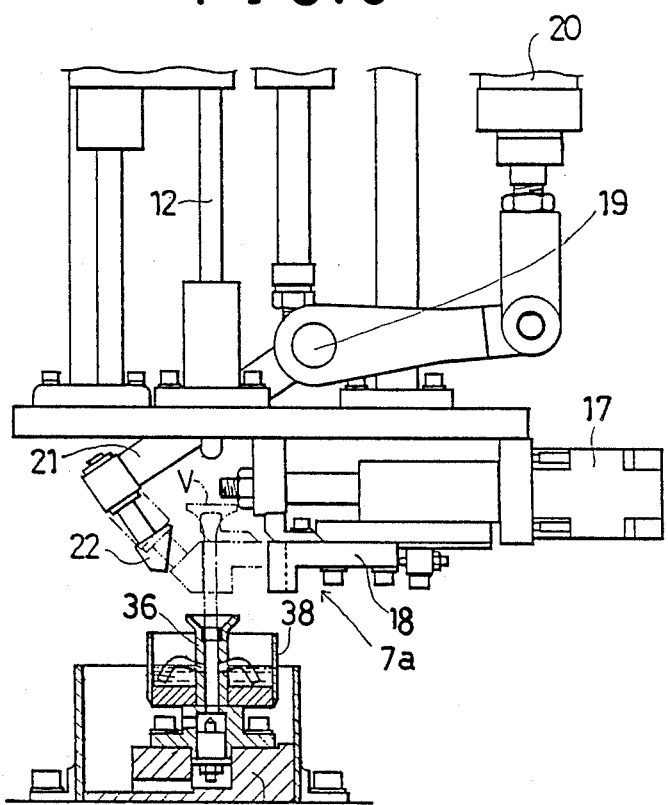
FIG. 6 is a side view showing the relation between the jig means and a valve supply means of the present invention.
Figure 7:
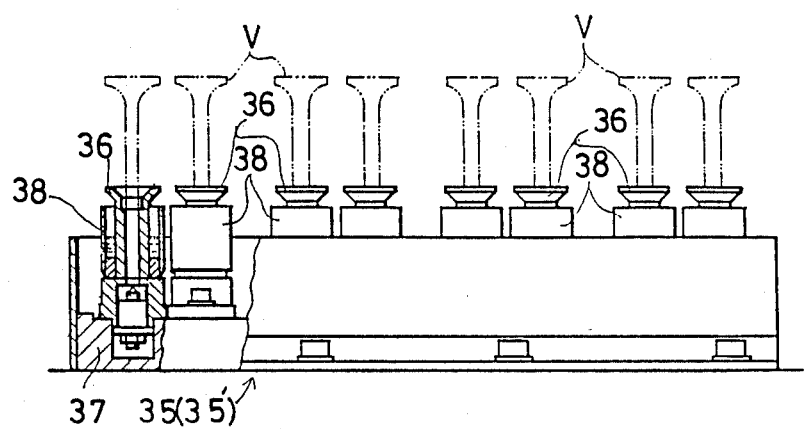
FIG. 7 is a front view, partly in section, of the valve supply means of the invention.

Valve supply means 35 and 35, for intake valves and exhaust valves are disposed on both sides of the machine base 1, and each of the supply means 35 and 35, comprises, as shown in FIGS. 6 and 7, plural holding tubes 36 mounted on supporting base 37 for detachably holding the valve V with its head portion facing up. Oil containing tanks 38 on the supporting case 37 surround the respective holding tubes 36, whereby oil is applied to the shaft or stem of each valve V.

The operation of the foregoing embodiment is as follows:

By a swing movement of the swingable frame 3, the valve inserting unit 7 is moved from the position shown in FIG. 1, to a position above the valve supply means 35 for loading valves. The frame 3 is then lowered by the cylinder 4.

Then, by operation of the cylinder 17 and the cylinder 20 of the valve holding means 7a, the guide member 18 and the closure member 22 which have already been separated are brought together to close the guide groove 18a, whereby the intake valve V held by each holding tube 36 of the supply means 35 is held thereon. The unit 7 is then raised and moved to a position above the jig means 23 by a swing movement of the swingable frame 3 and an advance movement of the supporting column 2. The jig plate 26 has already been swung from its horizontal position to its swung position on one side where one end of the stopper member 29 comes in contact with the stopper pin 32 while the suction means 33 is elevated. Thus, as shown in FIG. 8, the cylinder 34 is in contact with the stem seal S at the low end of the valve guide G on the intake side. A suction operation of the suction means 33 is then started by the negative pressure source at the same time as the downward movement of the unit 7 by the cylinder 4.

Figure 13:
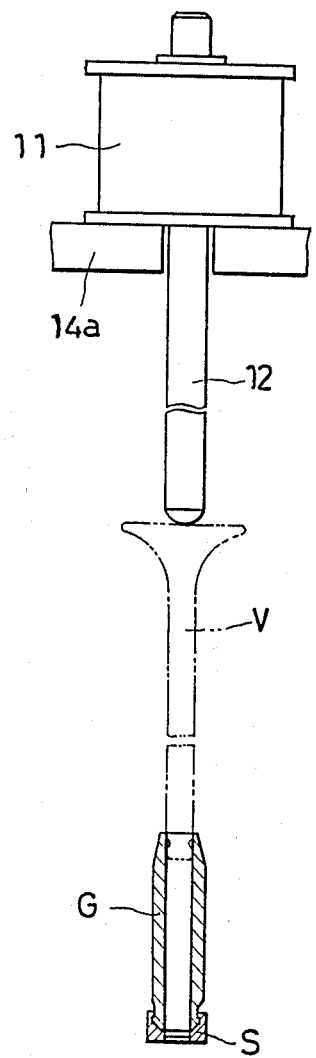
FIGS. 13–15 are views for explaining the operation of the valve push-in means of the present invention.

The intake valve V which is swingable held by the valve holding means 7a is compensated for in its centering error by the suction operation of the suction means 33, and, as shown in FIG. 9, the lower end thereof is drawn into an upper end opening of the valve guide G and the valve inserting unit 7 is stopped after being lowered to a predetermined position. Thereafter, the push rod supporting member 14 is lowered by the cylinder 13 to a position where the push rod 12 abuts the head portion of the intake valve V, as shown in FIG. 13. In this condition, as shown in FIG. 10, the holding of the intake valve V by the valve holding means 7a is released and the suction means 33 is lowered.

Figure 14:
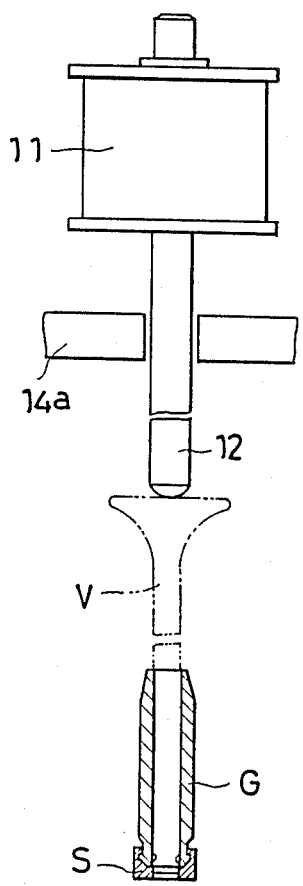
Figure 15:
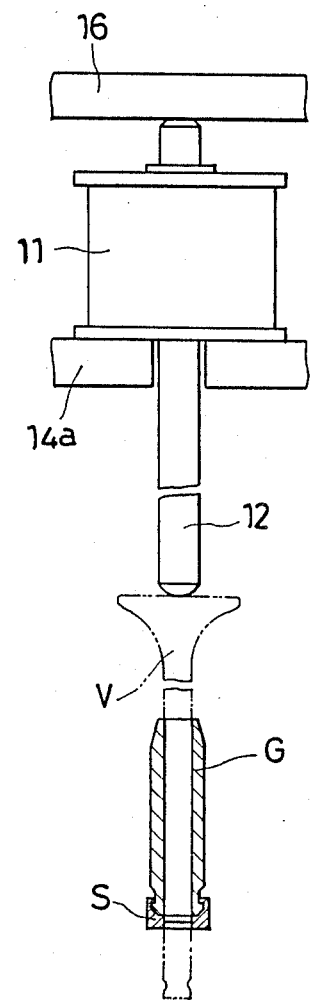

With the operations above, the intake valve V is, as shown in FIG. 14, inserted into the valve guide G by the weight of the push rod 12, and when the lower end of the intake valve V reaches the stem seal S, the intake valve V is stopped by the resilient force of the seal S. Then, the push-rod pushing member 16 is lowered by the cylinder 15 which pushes the push rod 12 whereby the lower end of the intake valve V is pushed out below the stem seal S as shown in FIG. 15 and the inserting operation of the intake valve V is completed.

Next, the push rod 12 is returned to its original position by elevating the pushing member 16 and the supporting member 14, and the unit 7 is elevated. By reverse movement of the supporting column 2 and a swing movement of the swingable frame 3' the unit 7 is moved to a position above the valve supply means 35' for the exhaust valve, and at this position, the unit 7 is lowered and the exhaust valve is held by the holding means 7a. Thereafter, the unit 7 is returned to a position above the jig means 23, and during this time, the jig plate 26 is swung to the position thereof in abutment with the stopper pin 32' wherein the longitudinal axis of the valve guide G' on the exhaust side is made vertical, and the inserting of the exhaust valve G' is carried out in almost the same manner as described above with respect to the intake valve G.

In the foregoing embodiment, the valve inserting unit is used for both the intake and exhaust valves, but a modification can be considered wherein the unit 7 may be used exclusively for the intake valves, for instance, and, as shown by imaginary lines in FIG. 1, a valve inserting unit 7', used exclusively for the exhaust valves, is provided on the swingable frame 3 through a supporting arm 6'. Thus, by advancing and retracting movements of the supporting column 2 and the swinging movement of the swingable frame 3, the respective units 7 and 7' move between a position above the respective valve supply means 35 and 35' and a position above the jig means 23, for effecting inserting operations of the respective valves.

Thus, according to this invention, the intake valve and the exhaust valve can be inserted into the respective valve guides at a single assembling station, and thus, the apparatus is made shorter in its line length to thereby improve the space efficiency of a factory.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

I claim:

1. A valve inserting apparatus for inserting an intake valve into an intake valve guide on an intake side of an internal combustion engine and an exhaust valve into an exhaust valve guide on an exhaust side of the internal combustion engine, both valve guides being attached to a cylinder head of the internal combustion engine in such a manner that longitudinal axial lines of both valve guides may cross each other obliquely, said valve inserting apparatus comprising:

a pair of valve supply means, one of the pair located at a first position for supply the intake valve, a head portion of the intake valve facing in an upward direction, and the other of the pair located at a second position for supplying the exhaust valve, a head portion of the exhaust valve also facing in an upward direction;

a jig means for locating the cylinder head relative to the valve supply means, located at a third position, having a jig plate which can hold the cylinder head set thereon in such a manner that a cylinder head surface toward a combustion chamber may be facing in an upward direction; and a valve inserting means for selecting either an intake or exhaust valve from one of said pair of valve supply means and for inserting said selected intake or exhaust valve in the cylinder head, said valve inserting means being movable between the first and the third positions and between the second and the third positions and comprising a holding means, for detachably holding said selected valve, and a valve push-in means for pushing said selected valve into place on the cylinder head;

wherein said jig means includes a jig base on which the jig plate is pivotally supported to be swingable on a horizontal shaft for swinging from a horizontal position to one swung position at which an axial line of the intake valve guide extends vertically toward the valve inserting means and to another swung position at which an axial line of the exhaust valve guide extends vertically toward the valve inserting means, so that said valve inserting means can insert into the intake valve guide an intake valve supplied from said one of the pair of valve supply means when the jig plate is swung to said one swung position and said valve inserting means can insert into the exhaust valve guide an exhaust valve supplied from said other of the pair of valve supply means when the jig plate is swung to said another swung position.

2. A valve inserting apparatus as claimed in claim 1, including a mounting base means, wherein said pair of valve supply means and said jig means are disposed around said mounting base means;

a supporting column means mounted on said mounting base means, said supporting column means being movable to advance towards and to retract away from said jig means; and a swingable frame swingably mounted on an outer circumference of said supporting column means, wherein said swingable frame supporting the valve inserting means is movable upwards and downwards;

wherein the valve inserting means may be moved by a back and forth movement of the supporting column means and by swinging of the swingable frame, to a position above each of the pair of valve supply means and to a position above the jig means.

3. A valve inserting apparatus for inserting an intake valve into an intake valve guide on an intake side of an internal combustion engine and an exhaust valve into an exhaust valve guide on an exhaust side of the internal combustion engine, both valve guides being attached to a cylinder head of the internal combustion engine in such a manner that longitudinal axial lines of the valve guides may cross each other obliquely, said valve inserting apparatus comprising:

a pair of valve supply means, one of the pair located at a first position for supplying the intake valve, a head portion of the intake valve facing an upward direction, and the other of the pair located at a second position for supplying the exhaust valve, a head portion of the exhaust valve also facing in an upward direction;

a jig means for locating the cylinder head relative to the valve supply means, located at a third position, have a jig plate which can hold the cylinder head set thereon in such a manner that a cylinder head surface toward a combustion chamber may be facing an upward direction; and a pair of valve inserting means, one of the pair of valve inserting means being for the intake valve and being movable between the first and the third positions and the other of the pair of valve inserting means being for the exhaust valve and being movable between the second and the third positions, each of the pair of valve inserting means comprising a holding means, for detachably holding the intake or exhaust valve, and a valve push-in means for pushing each valve in place on the cylinder head;

wherein said jig means includes a jig base on which the jig plate is pivotally supported to be swingable on a horizontal shaft for swinging from a horizontal position to one swung position at which an axial line of the intake valve guide extends vertically toward said one of the pair of valve inserting means and to another position at which an axial line of the exhaust valve guide extends vertically towards said one of the pair of valve inserting means, so that said one of the pair of valve inserting means for the intake valve can insert into the intake valve guide an intake valve supplied from said one of said pair of valve supply means when the jig plate is swung to said one swung position and said other of the pair of valve injection means for the exhaust valve can insert into the exhaust valve guide an exhaust valve supplied from said other of the pair of valve supply means when the jig plate is swung to said another swung position.

4. A valve inserting apparatus as claimed in claim 3, including a mounting base means, wherein said pair of valve supply means and said jig means are disposed around said mounting base means; a supporting column mounted on said mounting base means, said supporting column means being movable to advance towards and to retract from said jig means; and a swingable frame swingably mounted on an outer circumference of said supporting column means, and wherein said swingable frame supporting said pair of the valve inserting means is respectively movable upwards and downwards; wherein by a back and forth movement of the supporting column means and by swinging of the swingable frame, the one of the pair of the valve inserting means for the intake valve can be moved to a position above the one of the pair of the valve supply means for the intake valve and to a position above the jig means, and the other of the pair of inserting means for the exhaust valve can be moved to a position above the other of the pair of valve supply means for the exhaust valve and to a position above the jig means.

* * * * *